United States Patent Office 3,736,333
Patented May 29, 1973

3,736,333
THIENYL ALKYL TIN COMPOUNDS
James P. Foster and Samuel B. Soloway, Modesto, Calif., assignors to Shell Oil Company, New York, N.Y.
No Drawing. Filed July 12, 1971, Ser. No. 161,965
Int. Cl. C07d 63/12
U.S. Cl. 260—329 ME          5 Claims

ABSTRACT OF THE DISCLOSURE

Organo-tin compounds of the formula

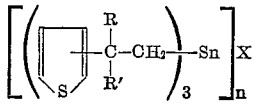

wherein R is a lower alkyl, R' is H or R, $n$ is 1 or 2 and X is a Cl or OH when $n$ is 1 and —O— when $n$ is 2 are useful in controlling mites.

BACKGROUND OF THE INVENTION

This invention is drawn to novel organo-tin compounds and to a method of controlling and killing mites by contacting them with the novel organo-tin compounds. More particularly, this invention relates to organo-tin compounds having the formula

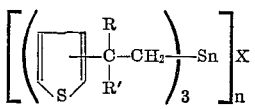

wherein R is lower alkyl, R' is hydrogen or lower alkyl, $n$ is an integer of 1 or 2 and X is a member selected from the group consisting of Cl, OH when $n$ is 1 and —O— when $n$ is 2; and to a method of controlling and killing mites by subjecting them to these compounds. By lower alkyl is meant $C_1$ to $C_4$ alkyl which includes both straight and branched chains, i.e., methyl, ethyl, propyl, isopropyl, butyl, isobutyl, sec-butyl.

It is well known, especially to the farmer, that millions of dollars worth of damage is done each year to agricultural crops and especially to fruit trees by mites. Various miticides used to control these pests have proven to be unsuccessful over a period of time due to the mites becoming "resistant" to the miticide. This problem is very ably demonstrated in Farm Chemicals, vol. 132, No. 9, September 1969, pp. 50–68. As noted by the above article, this problem is particularly true of the various chlorinated hydrocarbon and organophosphate miticides. It is therefore evident that new classes of miticides are essential in order to meet the rising demand for the control of these farm pests. In U.S. Pat. 3,264,177, tri-cyclohexyl derivatives of tetravalent tin are stated to be active miticides. Apparently this activity was limited to the tricyclohexyl derivatives as there are no known teachings in the art that other organo-tin compounds possess miticidal activity, even though many organo-tin compounds are known.

It has now been discovered that organo-tin compounds having the above formula possess selective activity as miticides.

The unique miticidal properties of the present invention are apparently related to the alkyl substitution on the carbon atom adjacent to the thienyl ring. It is also desirable that there be a two-carbon bridge between the tin atom and the thienyl ring. In other words, it is believed that there are at least two points of criticality necessary for the compounds utilized in this invention to show specific activity as miticides.

In the preferred class of compounds R is methyl, R' is hydrogen or methyl, $n$ is 1 or 2 and X may be Cl, OH or —O—. Especially preferred are those compounds wherein both R and R' are methyl.

As is generally true with metal oxides and hydroxides, the compounds wherein X is O or OH are interconvertible and may exist in either form or in equilibrium, i.e.,

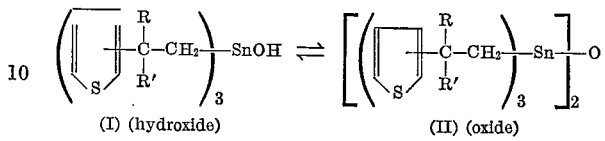

(I) (hydroxide)          (II) (oxide)

In the presence of aqueous media the equilibrium between I and II lies in favor of I, whereas in non-aqueous media the equilibrium lies in favor of II. For purposes used herein the designation of either I or II separately may be considered to be either that compound per se or mixtures of I and II in equilibrium. The miticidal activity of the hydroxide form (I), the oxide form (II) or mixtures in equilibrium are considered to be comparable although there may be minor variances.

The compounds of the present invention are closely related to the tri(β-substituted phenethyl) tin compounds taught in U.S. Pat. 3,657,451. The primary difference lies in the replacement of the phenyl moiety with a thienyl group. The compounds of the present invention can be prepared following basically the same methods used for preparing the corresponding phenethyl derivatives. Such methods are disclosed in Inorganic Chemistry, vol. 5, No. 1, January 1966, pp. 87–91 and in the Journal of Organic Chemistry, vol. 31, 1966, pp. 3857–3860.

In general, the compounds of the present invention are prepared by reacting thiophene with an appropriate allyl halide such as methallyl chloride to form 2-(2-halo 1-alkyl substituted alkyl or 1,1-disubstituted ethyl) thiophene. The 2-(2-halo 1-alkyl substituted ethyl) thiophene is then converted into a Grignard reagent by treating it with magnesium which is then further treated with a tin halide to form a tris(2 or 2,2-disubstituted 2-thienyl ethyl)tin halide. The halide may be converted to the hydroxide or oxide form by refluxing with an aqueous base such as sodium hydroxide.

The compounds of this invention are particularly useful in combatting mites which inhabit the various fruit trees throughout the United States and particularly the MacDaniel mites which are prevalent in the Western United States and the European red mites, which inhabit the Eastern seaboard of the United States. Other prevalent mites controlled by the invention are 2-spotted spider mites and rust mites. A distinct advantage of the present method is that, while showing some activity, it is less effective against typhlodromus mites than other mites. The typhlodromus mites are predacious mites which prey upon the plant-eating mites and do not harm the plant itself. It is therefore desirable by application of a miticide to reduce the population of the plant-eating mites as much as possible without destroying the predacious mites.

The compositions of the present invention may be made up in either concentrated or dilute form for ease in handling and shipping. In order to reduce shipping costs, the compositions are initially made up in a concentrated phase and then are diluted with an additional carrier just prior to application. In preparing the compositions of the invention the tin compound is mixed or combined with one or more of the conventional pesticidal additives or adjuvants including organic solvents, water, or other liquid carriers, surface active agents, or particulate and finely-divided solids.

In the preparation of solid or finely-divided solid compositions, the tin compound is mixed with any of the commonly used finely-divided agricultural carriers such as fuller's earth, bentonite, diatomaceous earth, kaolin, talc, chalk, and the like. In preparing such compositions, the finely-divided carrier is mixed with the miticide or the two may be first mixed together and then run through a series of milling operations to reduce the size of the particles. The particle reduction may be carried out either with the dry materials or by first mixing the toxicant and/or carrier in a liquid. These dust compositions can be employed as concentrates and then subsequently mixed with additional carrier to obtain the desired amount of toxicant in a composition to be employed for the control of mites.

If desired, solid compositions can be mixed with a surface-active or dispersing agent to form a wettable powder. Such powders are easily dispersible in a liquid carrier to form sprays or solutions. Suitable surface-acting or dispersing agents include ionic or non-ionic emulsifying or dispersing agents such as high alkyl alkoxy sulfonates, polyoxyethylene sorbitans, alkyl phenoxy polyethoxy ethanols and lignosulfonates. These wettable powders containing the toxicant and surface-active agent may be diluted for use in a solvent such as water or water-oil mixtures.

The compositions of this invention may also be made up as emulsifiable concentrates or water-dispersible liquids. In so doing, the tin compound may be mixed with suitable water-immiscible organic solvent and a surface-active agent to produce the emulsifiable concentrate. This concentrate may exist either as a water-in-oil concentrate or an oil-in-water concentrate having a thick mayonnaise-like consistency. When ready for application, such concentrates are further diluted with water to form spray mixtures having the toxicant homogeneously suspended throughout. Representative dispersing agents which may be utilized in the compositions of the present invention are alkylphenoxy polyethoxy ethanols and lignosulfonates. These surface-active or dispersing agents are usually employed in the concentrate in amounts varying from about 0.5 to about 10% w. of the concentrate.

In making up the compositions, whether they be in the form of a dry mixture or an emulsifiable concentrate, the amount of toxicant in said composition will usually range from about 1 to about 80% w. basis total composition. Other ingredients may also be incorporated into the compositions such as other pesticides.

In carrying out the method of the present invention, the mites are killed or controlled by contacting them with a miticidally effective dosage of the appropriate tin compound. While it is within the scope of the present invention to contact the pest with the unformulated tin compound, it is most desirable to contact the pest with a formulated material. The formulated material will comprise the compositions previously mentioned which have been diluted for application. The exact concentration of the tin products in the diluted composition to be applied will depend upon the toxicity of the tin compound as well as the method of application. Therefore, the actual weight of the active toxicant in the composition will vary depending upon the susceptibility of the pest to the compound. The compounds have demonstrated residual activity in that they are known to be active over a period of days or weeks, so that a mite coming into contact with a substrate containing the pesticide such as plants, soil or buildings will be desetroyed or killed. In general, when utilizing dusts, the mites may be killed or controlled with compositions containing from about 1 to about 5% by weight of the toxicant in the composition. When applying the toxicant in the form of a spray or liquid, effective dosages are usually obtained with liquid compositions containing from about 0.015 to about 0.06% by weight of the toxicant. The compositions utilized in this invention are relatively non-phytotoxic to plants when applied within the preferred range.

If desired, the compositions of the present invention may be utilized with other active toxicants such as insecticides, herbicides, etc.

In order to demonstrate the invention more fully the following examples are given.

EXAMPLE I (a) Preparation of 2-(2-chloro-1,1-dimethylethyl) thiophene

A solution of 90 ml. (1 mole) of methallyl chloride and 40 ml. (0.5 mole) of thiophene was added dropwise, with stirring, to a refluxing solution of 20 ml. (0.08 mole) of boron trifluoride etherate in 40 ml. (0.5 mole) of thiophene. The mixture was refluxed for two hours and stirred overnight at room temperature. The mixture was then diluted with 100 ml. of ether and washed with 200 ml. portions of water, 1% sodium hydroxide and water, and dried over magnesium sulfate. The ether in the mixture was evaporated on a steam bath. Distillation of the residual material yielded 19 grams of 2-(2-chloro-1,1-dimethylethyl)thiophene. Structure determination was made by elemental analysis and confirmed by NMR spectra analysis.

(b) Preparation of tris[2-methyl-2-(2-thienyl)propyl]tin chloride

A solution containing 12.5 grams (0.07 mole) of 2-(2-chloro-1,1-dimethylethyl)thiophene in 25 ml. of tetrahydrofuran was added to 2.4 g. (0.1 mole) of magnesium turnings. The resulting Grignard mixture was then added to 3.8 ml. (0.03 mole) of tin(IV) chloride in 30 ml. of benzene. After addition the reaction mixture was allowed to stand for about 30 minutes after which 150 ml. of hexane, 150 ml. of ice water and 50 ml. of 10% HCl were added in that order with stirring. The organic phase was separated and dried over magnesium sulfate and the solvent was removed under reduced pressure yielding 10 grams of crude product as a viscous oil. Trituration of this material in cold methanol resulted in partial crystallization. These crystals were filtered, washed with cold ethanol and recrystallized from ethanol to yield 2.1 g. of tris[2-methyl-2-(2-thienyl)propyl]tin chloride. The structure was confirmed by both NMR and IR spectra analysis.

EXAMPLE II

Preparation of tris[2-methyl-2-(2-thienyl)propyl] tin hydroxide and oxide

A solution of 1.2 g. (0.002 mole) of tris[2-methyl-2-(2-thienyl)propyl]tin chloride in 8 ml. of benzene was shaken for one hour with 10 ml. of 10% sodium hydroxide solution. After shaking, 10 ml. of ether was added and the organic layer was separated, washed once with water and dried over magnesium sulfate. The solvents were evaporated on a steam bath and the crude product was recrystallized from hexane to yield 0.6 g. of a mixture of tris[2-methyl-2-(2-thienyl)propyl]tin hydroxide and oxide. Structure determination was made by infrared spectra analysis.

EXAMPLE III

Fifty-two parts by weight of technical tris(2-methyl-2-thienylpropyl)tin chloride (95% purity) are blended with 3 parts by weight of sodium-lauryl-sulfate (Duponol ME), 3 parts by weight of an ionic desugared sodium lignin sulfonate (Marasperse N-22) and 42 parts by weight of finely-divided continental clay. These ingredients are blended together, hammer-milled, air-milled and afterblended to form a 50% wettable powder concentrate.

Similarly, 55.6 parts by weight of technical tris(2-methyl-2-thienylpropyl)tin hydroxide and oxide are blended with 3 parts of sodium-lauryl-sulfate, 3 parts of a sodium lignin sulfonate and 38.4 parts of continental clay. Milling and blending produces a concentrate in the form of a 50% wettable powder.

EXAMPLE IV

The toxicity index (TI) of the organo-tin compounds against the 2-spotted spider mite was determined using parathion as a standard. The $LC_{50}$ of the organo-tin compounds was determined and the TI's were calculated as follows:

$$TI = \frac{LC_{50} \text{ (Parathion)}}{LC_{50} \text{ (Test Compound)}} \times 100$$

In other words any compounds having a TI of under 100 were not as active as parathion and those having a TI about 100 were more active. The results are reported in Table I.

TABLE I

Toxicity Index for 2-Spotted Spider Mite $(R'')_3SnX$

| R'' | X | |
|---|---|---|
| | Cl | OH |
|  | 210 | a 300 | a May be as a mixture with $(R'')_3SnOSn(R'')_3$.

It is evident from the above table that the compounds of this invention are from 2 to 3 times as active against 2-spotted spider mites as parathion.

EXAMPLE V

The efficacy of tris[2-methyl-2-(2-thienyl)propyl] tin chloride against both susceptible and organo phosphate resistant mites (*Tetranychus urticae*) is shown in this example.

Susceptible and resistant mites were both treated with the same dosage of toxicant with the results as follows:

| Dosage percent toxicant | Average mortality after 24 hours, percent | |
|---|---|---|
| | Susceptible | Resistant |
| 0.008 | 11 | 1 |
| 0.016 | 28 | 17 |
| 0.032 | 74 | 83 |

It is obvious from the above that compounds within the scope of the invention function effectively against organo phosphate resistant mites as well as against susceptible mites.

We claim as our invention:

1. A compound of the formula

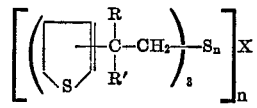

wherein R is lower alkyl, R' is hydrogen or lower alkyl, $n$ is 1 or 2 and X is a member selected from the group consisting of Cl and OH when $n$ is 1 and —O— when $n$ is 2.

2. A compound according to claim 1 wherein R is methyl and R' is methyl or hydrogen.

3. A compound according to claim 2 wherein R' is methyl, $n$ is 1 and X is OH.

4. A compound according to claim 2 wherein R' is methyl, $n$ is 2 and X is O.

5. A compound according to claim 2 wherein R' is methyl, $n$ is 1 and X is Cl.

References Cited

UNITED STATES PATENTS 3,657,451   4/1972   Horne _____ 424—288
2,965,661   12/1960   Ramsden _____ 260—429.7

HENRY R. JILES, Primary Examiner

C. M. S. JAISLE, Assistant Examiner

U.S. Cl. X.R.

260—332.5; 424—275